(12) United States Patent
Bega et al.

(10) Patent No.: US 12,219,376 B2
(45) Date of Patent: Feb. 4, 2025

(54) DETECTION OF ABNORMAL NETWORK FUNCTION SERVICE USAGE IN COMMUNICATION NETWORK

(71) Applicant: Nokia Technologies Oy, Espoo (FI)

(72) Inventors: Dario Bega, Munich (DE); Gerald Kunzmann, Munich (DE); Chaitanya Aggarwal, Munich (DE)

(73) Assignee: Nokia Technologies Oy, Espoo (FI)

( * ) Notice: Subject to any disclaimer, the term of this patent is extended or adjusted under 35 U.S.C. 154(b) by 323 days.

(21) Appl. No.: 17/462,319

(22) Filed: Aug. 31, 2021

(65) Prior Publication Data

US 2023/0068651 A1   Mar. 2, 2023

(51) Int. Cl.
| | |
|---|---|
| *H04W 24/08* | (2009.01) |
| *H04L 41/147* | (2022.01) |
| *H04L 41/16* | (2022.01) |
| *H04W 24/02* | (2009.01) |

(52) U.S. Cl.
CPC ........... *H04W 24/08* (2013.01); *H04L 41/147* (2013.01); *H04L 41/16* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 9,628,395 B1 * | 4/2017 | Teller | H04L 43/0894 |
| 11,310,731 B1 * | 4/2022 | Feder | H04W 8/08 |
| 11,373,056 B2 * | 6/2022 | Dinger | G06F 18/251 |
| 2008/0117869 A1 * | 5/2008 | Freen | H04W 72/04 370/329 |
| 2013/0268678 A1 * | 10/2013 | Subramanian | H04L 41/50 709/226 |
| 2015/0127595 A1 * | 5/2015 | Hawkins, II | G06N 7/01 706/46 |

(Continued)

OTHER PUBLICATIONS

3GPP, "3rd Generation Partnership Project; Technical Specification Group Services and System Aspects; Architecture Enhancements for 5G System (5GS) to Support Network Data Analytics Services (Release 17)" 3GPP TS 23.288 V17.1.0, Jun. 2021, 192 pages.

(Continued)

*Primary Examiner* — Christopher T Wyllie
(74) *Attorney, Agent, or Firm* — Ryan, Mason & Lewis, LLP (57) ABSTRACT

Techniques for detection of abnormal network function service usage in a communication network are disclosed. For example, a method comprises obtaining, at a first network entity, one or more service requests previously received by a second network entity for a service which the second network entity is configured to provide in a communication network. The method further comprises obtaining, at the first network entity, an analysis of the one or more service requests previously received by the second network entity for the service. The method further comprises obtaining, at the first network entity, an expected service usage for the service from the analysis of the one or more service requests. The method may then compare incoming service requests to the expected service usage to detect a given condition, e.g., an abnormal condition, so that at least one action can be taken.

20 Claims, 3 Drawing Sheets

(56) References Cited

U.S. PATENT DOCUMENTS

| | | | |
|---|---|---|---|
| 2016/0212060 A1* | 7/2016 | Holcombe | H04L 63/08 |
| 2016/0379125 A1* | 12/2016 | Bordawekar | G06F 9/5027 706/12 |
| 2019/0155651 A1* | 5/2019 | Di Cairano-Gilfedder | G06F 9/5061 |
| 2019/0373006 A1* | 12/2019 | Chandana | H04L 63/1425 |
| 2020/0358689 A1* | 11/2020 | Lee | H04L 43/028 |
| 2021/0021624 A1* | 1/2021 | Peng | H04L 63/1425 |
| 2021/0160147 A1* | 5/2021 | Chou | H04L 43/0817 |
| 2021/0250307 A1* | 8/2021 | Pal | H04L 67/61 |
| 2021/0392049 A1* | 12/2021 | Jeuk | H04L 41/16 |
| 2021/0392540 A1* | 12/2021 | Chong | H04W 28/0268 |
| 2022/0046101 A1* | 2/2022 | Zhang | H04L 67/51 |
| 2022/0167211 A1* | 5/2022 | Sharma | H04L 12/4641 |
| 2022/0201534 A1* | 6/2022 | Wang | H04W 24/04 |
| 2022/0358023 A1* | 11/2022 | Moser | G06F 11/079 |
| 2022/0408293 A1* | 12/2022 | Han | H04W 28/16 |
| 2023/0068651 A1* | 3/2023 | Bega | H04L 41/16 |
| 2023/0077340 A1* | 3/2023 | Han | H04L 67/51 709/224 |

OTHER PUBLICATIONS

E. De Cristofaro, "An Overview of Privacy in Machine Learning," arXiv:2005.08679v1, May 18, 2020, 12 pages.

3GPP, "3rd Generation Partnership Project; Technical Specification Group Services and System Aspects; Management and Orchestration; Study on Enhancement of Management Data Analytics (MDA) (Release 17)" 3GPP TS 28.809 V17.0.0, Mar. 2021, 95 pages.

3GPP, "3rd Generation Partnership Project; Technical Specification Group Services and System Aspects; Study on Security Aspects of Enablers for Network Automation (eNA) for the 5G system (5GS) Phase 2; (Release 17)" 3GPP TR 33.866 V0.5.0, May 2021, 41 pages.

3GPP, "3rd Generation Partnership Project; Technical Specification Group Services and System Aspects; System Architecture for the 5G System (5GS); Stage 2 (Release 16)" 3GPP TS 23.501 V16.5.0, Jul. 2020, 441 pages.

3GPP "3rd Generation Partnership Project; Technical Specification Group Services and System Aspects; Procedures for the 5G System (5GS); Stage 2 (Release 16)" 3GPP TS 23.502 V16.3.0, Dec. 2019, 558 pages.

3GPP, "3rd Generation Partnership Project; Technical Specification Group Services and System Aspects; Security Architecture and Procedures for 5G System (Release 16)" 3GPP TS 33.501 V16.3.0, Jul. 2020, 248 pages.

3GPP, "3rd Generation Partnership Project; Technical Specification Group Services and System Aspects; Study on Enablers for Network Automation for the 5G System (5GS); Phase 2 (Release 17)" 3GPP TR 23.700-91 V17.0.0, Dec. 2020, 382 pages.

* cited by examiner

DETECTION OF ABNORMAL NETWORK FUNCTION SERVICE USAGE IN COMMUNICATION NETWORK

FIELD

The field relates generally to communication networks, and more particularly, but not exclusively, to security management in such communication networks.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point of an access network referred to as a 5G AN in a 5G network. The access point (e.g., gNB) is illustratively part of an access network of the communication system. For example, in a 5G network, the access network referred to as a 5G AN is described in 5G Technical Specification (TS) 23.501, entitled "Technical Specification Group Services and System Aspects; System Architecture for the 5G System," and TS 23.502, entitled "Technical Specification Group Services and System Aspects; Procedures for the 5G System (5GS)," the disclosures of which are incorporated by reference herein in their entireties. In general, the access point (e.g., gNB) provides access for the UE to a core network (CN or 5GC), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues associated with network function and their services can present a significant challenge.

SUMMARY

Illustrative embodiments provide techniques for detection of abnormal network function service usage in a communication network.

For example, in one illustrative embodiment, a method comprises obtaining, at a first network entity, one or more service requests previously received by a second network entity for a service which the second network entity is configured to provide in a communication network. The method further comprises obtaining, at the first network entity, an analysis of the one or more service requests previously received by the second network entity for the service. The method further comprises obtaining, at the first network entity, an expected service usage for the service from the analysis of the one or more service requests.

In additional illustrative embodiments, the method may further comprise: receiving, at the first network entity from the second network entity, one or more service requests received by the second network entity for the service from one or more service consumers; comparing, at the first network entity, the received one or more service requests to the expected service usage; and notifying, by the first network entity, the second network entity of a result of the comparison to enable at least one action to be taken upon detection of a given condition. In some illustrative embodiments, the given condition is indicative of an abnormal condition.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

Additional embodiments are provided from the perspective of other network entities in the communication network.

Advantageously, illustrative embodiments provide detection of potential privacy attacks aimed at inferring service functionalities and sensitive information as membership or architectural details. Furthermore, illustrative embodiments detect distributed attacks even if the requests frequency is as expected.

These and other features and advantages of embodiments described herein will become more apparent from the accompanying drawings and the following detailed description.

DETAILED DESCRIPTION

Embodiments will be illustrated herein in conjunction with example communication systems and associated techniques for security management in communication systems.

It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other details that one of ordinary skill in the art will realize. For example, TS 23.288 entitled "Technical Specification Group Services and System Aspects; Architecture Enhancements for 5G System (5GS) to Support Network Data Analytics Services," TR 33.866 entitled "Technical Specification Group Services and System Aspects; Study on Security Aspects of Enablers for Network Automation (eNA) for the 5G System (5GS) Phase 2," TR 28.809 entitled "Technical Specification Group Services and System Aspects; Management and Orchestration; Study on Enhancement of Management Data Analytics (MDA)," and TR 23.700-91 entitled "Technical Specification Group Services and System Aspects; Study on Enablers for Network Automation for the 5G System (5GS); Phase 2," the disclosures of which are incorporated by reference herein in their entireties, may also be mentioned below in the context of some illustrative embodiments. However, while well-suited for 5G-related 3GPP standards, embodiments are not necessarily intended to be limited to any particular standards.

Furthermore, as illustratively used herein, various abbreviations will be referenced including, but not limited to, the following:
ADRF: Analytics Data Repository Function
NWDAF: Network Data Analytics Function
NWDAF(AnLF): Network Data Analytics Function containing Analytics Logical Functionality
MnS: Management service
OAM: Operation, Administration and Maintenance
NF: Network Function
MDAS: Management Data Analytics Service Prior to describing illustrative embodiments, a general description of certain main components of a 5G network will be described below in the context of FIGS. 1 and 2.

Figure 1:
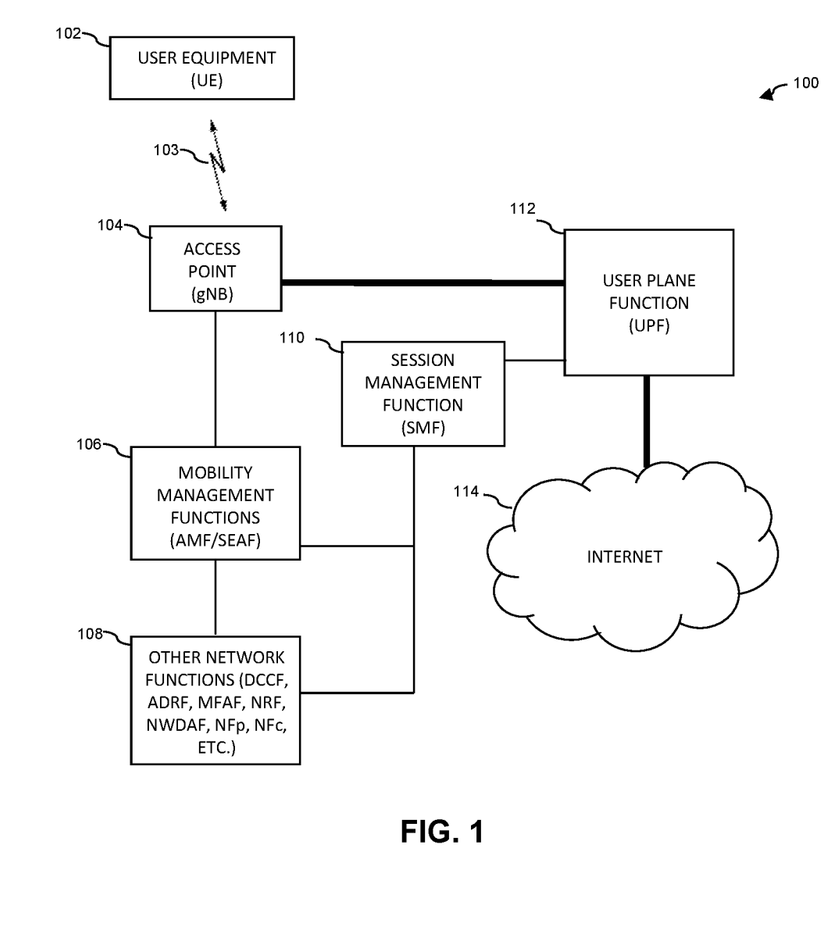
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, at least some functions that facilitate an explanation of illustrative embodiments are represented. Subsequent figures may depict some additional elements/functions (i.e., network entities).

Accordingly, as shown, communication system 100 comprises user equipment (UE) 102 that communicates via an air interface 103 with an access point (gNB) 104. It is to be understood that UE 102 may use one or more other types of access points (e.g., access functions, networks, etc.) to communicate with the 5G core other than a gNB. By way of example only, the access point 104 may be any 5G access network such as an N3IWF (Non-3GPP Interworking Function), a TNGF (Trusted Non-3GPP Gateway Function) or a W-AGF (Wireline Access Gateway Function) or may correspond to a legacy access point (e.g., eNB).

The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores a permanent subscription identifier and its related key, which are used to uniquely identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) unique to the UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI). Another example of a SUPI uses a Network Access Identifier (NAI). NAI is typically used for IoT communication.

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to other network functions 108. As shown, some of these other network functions 108 include, but are not limited to, a Data Collection and Coordination Function (DCCF), an Analytics Data Repository Function (ADRF), a Messaging Framework Adapter Function (MFAF), a Network Repository Function (NRF), Network Data Analytics Function (NWDAF), and other network functions that can act as service producers (NFp) and/or service consumers (NFc). Note that any network function can be a service producer for one service and a service consumer for another service. Further, when the service being provided includes data, the data-providing NFp is referred to as a data producer, while the data-requesting NFc is referred to as a data consumer. A data producer may also be an NF that generates data by modifying or otherwise processing data produced by another NF.

Note that a UE, such as UE 102, is typically subscribed to what is referred to as a Home Public Land Mobile Network (HPLMN) in which some or all of the functions 106 and 108 reside. The HPLMN is also referred to as the Home Environment (HE). If the UE is roaming (not in the HPLMN), it is typically connected with a Visited Public Land Mobile Network (VPLMN) also referred to as a visited or serving network. In such case, some of the network functions 106 and 108 can reside in the VPLMN, in which case, functions in the VPLMN communicate with functions in the HPLMN as needed. However, in a non-roaming scenario, mobility management functions 106 and the other network functions 108 reside in the same communication network, i.e. HPLMN. Embodiments described herein are not limited by which functions reside in which PLMN (i.e., HPLMN or VPLMN).

The access point 104 is also operatively coupled (via one or more of functions 106 and/or 108) to a serving gateway function, i.e., Session Management Function (SMF) 110, which is operatively coupled to a User Plane Function (UPF) 112. UPF 112 is operatively coupled to a Packet Data Network, e.g., Internet 114. Note that the thicker solid lines in this figure denote a user plane (UP) of the communication network, as compared to the thinner solid lines that denote a control plane (CP) of the communication network. It is to be appreciated that network 114 in FIG. 1 may additionally or alternatively represent other network infrastructures including, but not limited to, cloud computing infrastructure and/or Edge computing infrastructure. Further typical operations and functions of such network elements are not described here since they are not the focus of the illustrative embodiments and may be found in appropriate 3GPP 5G documentation. Note that functions shown in 106, 108, 110 and 112 are examples of network functions (NFs).

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
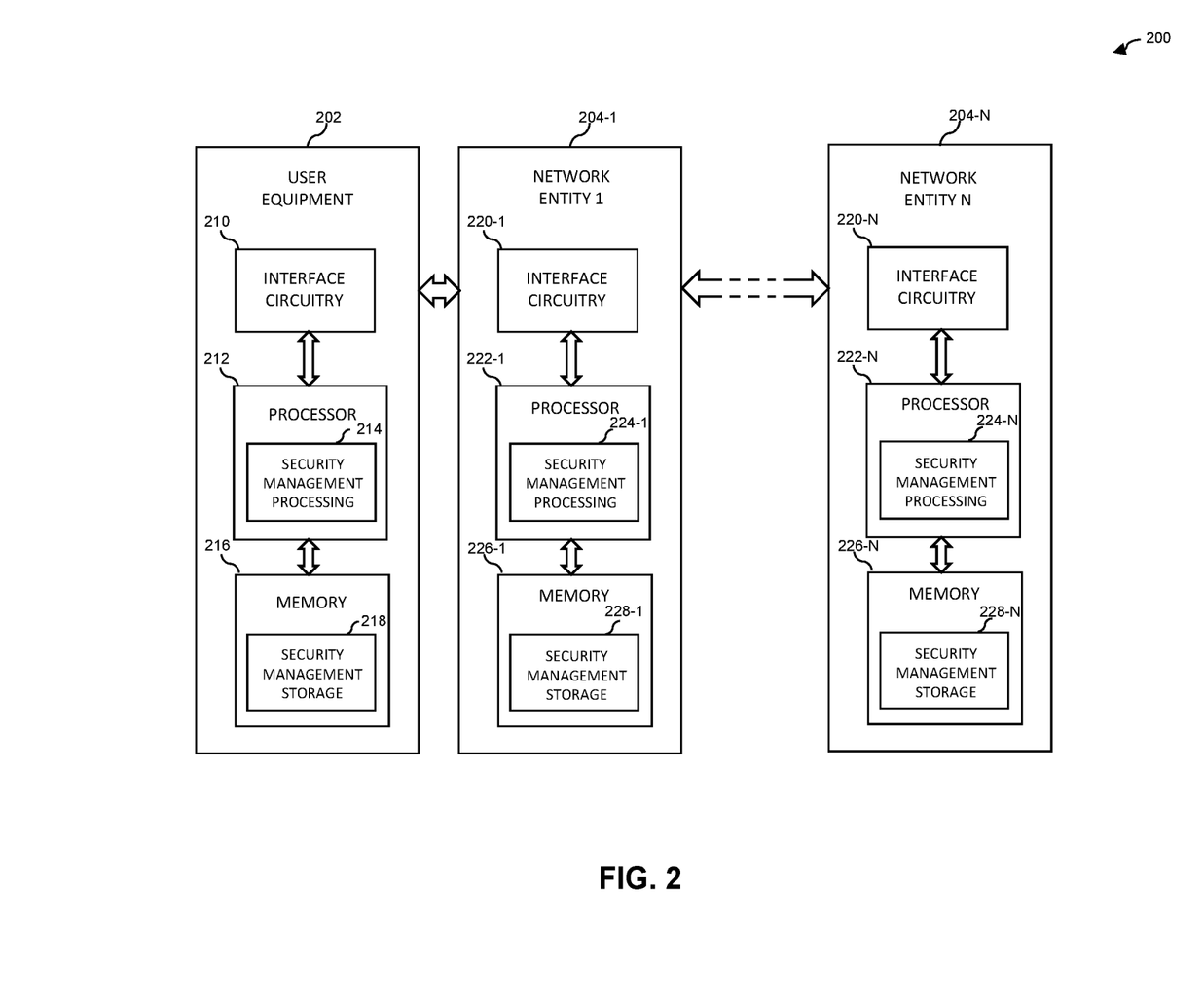
FIG. 2 illustrates user equipment and network entities with which one or more illustrative embodiments may be implemented.

FIG. 2 is a block diagram illustrating computing architectures for various participants in methodologies according to illustrative embodiments. More particularly, system 200 is shown comprising user equipment (UE) 202 and a plurality of network entities 204-1, . . . , 204-N. For example, in illustrative embodiments and with reference back to FIG. 1, UE 202 can represent UE 102, while network entities 204-1, . . . , 204-N can represent functions 106 and 108. It is to be appreciated that the UE 202 and network entities 204-1, . . . , 204-N are configured to interact to provide security management and other techniques described herein.

The user equipment 202 comprises a processor 212 coupled to a memory 216 and interface circuitry 210. The processor 212 of the user equipment 202 includes a security management processing module 214 that may be implemented at least in part in the form of software executed by the processor. The processing module 214 performs security management described in conjunction with subsequent figures and otherwise herein. The memory 216 of the user equipment 202 includes a security management storage module 218 that stores data generated or otherwise used during security management operations.

Each of the network entities (individually or collectively referred to herein as 204) comprises a processor 222 (222-1, . . . , 222-N) coupled to a memory 226 (226-1, . . . , 226-N) and interface circuitry 220 (220-1, . . . , 220-N). Each processor 222 of each network entity 204 includes a security management processing module 224 (224-1, . . . , 224-N) that may be implemented at least in part in the form of software executed by the processor 222. The processing module 224 performs security management operations described in conjunction with subsequent figures and otherwise herein. Each memory 226 of each network entity 204 includes a security management storage module 228 (228-1, . . . , 228-N) that stores data generated or otherwise used during security management operations.

The processors 212 and 222 may comprise, for example, microprocessors such as central processing units (CPUs), application-specific integrated circuits (ASICs), digital signal processors (DSPs) or other types of processing devices, as well as portions or combinations of such elements.

The memories 216 and 226 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 and 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

Further, the memories 216 and 226 may more particularly comprise, for example, electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 illustratively comprise transceivers or other communication hardware or firmware that allows the associated system elements to communicate with one another in the manner described herein.

It is apparent from FIG. 2 that user equipment 202 and plurality of network entities 204 are configured for communication with each other as security management participants via their respective interface circuitries 210 and 220. This communication involves each participant sending data to and/or receiving data from one or more of the other participants. The term "data" as used herein is intended to be construed broadly, so as to encompass any type of information that may be sent between participants including, but not limited to, identity data, key pairs, key indicators, security management messages, registration request/response messages and data, request/response messages, authentication request/response messages and data, metadata, control data, audio, video, multimedia, other messages, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as gNB 104, SMF 110, and UPF 112 may each be configured to include components such as a processor, memory and network interface. These elements need not be implemented on separate stand-alone processing platforms, but could instead, for example, represent different functional portions of a single common processing platform.

More generally, FIG. 2 can be considered to represent processing devices configured to provide respective security management functionalities and operatively coupled to one another in a communication system.

As mentioned above, the 3GPP TS 23.501 defines the 5G system architecture as service-based, e.g., Service-Based Architecture (SBA). It is realized herein that in deploying different NFs, there can be many situations where an NF may need to interact with an entity external to the SBA-based 5G core network (e.g., including the corresponding PLMN(s), e.g., HPLMN and VPLMN). Thus, the term "internal" as used herein illustratively refers to operations and/or communications within the SBA-based 5G core network (e.g., SBA-based interfaces) and the term "external" illustratively refers to operations and/or communications outside the SBA-based 5G core network (non-SBA interfaces).

Given the above general description of some features of a 5G network, problems with existing security approaches and solutions proposed in accordance with illustrative embodiments will now be described herein below.

Artificial Intelligence (AI) and Machine Learning (ML) techniques are being increasingly employed in 5G system (5GS). NWDAF in 5G core (5GC) and MDAS for OAM are two elements in the 5GS that bring intelligence and generate analytics by processing management and network data, and may employ AI and ML techniques.

AI/ML models are carefully designed to accomplish a specific task and they are trained on proprietary data to generate requested analytics. Therefore, AI/ML models are considered proprietary information for their producers.

There exist multiple attacks aimed at reproducing AI/ML models functionality and architecture, inferring training data sets and their members. Malicious consumers could be able to successfully perform their attacks even without having access to the model itself but just by querying the model and observing the outputs.

Accordingly, while 3GPP supports the usage of AI/ML models to provide an increasing number of analytics and other use cases, and NWDAF and MDAS may leverage on AI/ML models to produce analytics to authorized consumers, malicious consumers may mount attacks with the goal of reproducing the AI/ML model functionalities and/or inferring sensitive information about the training data set.

3GPP does not yet provide any security mechanism to protect proprietary AI/ML models from privacy attacks. Furthermore, 3GPP does not provide any control over data collected by NWDAF/MDAS and used to produce the analytics. Malicious consumers can send analytics requests and coordinating with data sources (e.g., the attacker request analytics for a specific area of interest (AOI) where he has control of the data source(s)) can provide specifically generated input data with the goal of maximizing the information extracted. In this way, the malicious consumers is able to retrieve sensitive information and can initiate an inference based attack at the AI/ML model or can infer the architecture and/or training data used to train the model.

Furthermore, since AI/ML models are able to approximate any function, those attacks may allow a malicious consumer to initiate an inference based attack even at a non-ML functionality by training a ML model using the analytics provided by the producer. In this way, an attacker would be able to approximate the function utilized by the producer to provide the required analytics.

Illustrative embodiments provide a different approach compared with the above-mentioned solutions to detect malicious service consumers based on the requests distribution and not on operator specific rules. In particular, by monitoring the distribution of the incoming requests received by a NF service, illustrative embodiments enable the NWDAF to detect potential privacy attacks aiming at inferring the AI/ML model functionalities and sensitive information as membership (training data) or architectural details. Furthermore, illustrative embodiments detect distributed attacks even if the requests frequency is as expected.

Illustrative embodiments provide enablers for detecting privacy attacks against network functions in the mobile network. More particularly, illustrative embodiments introduce two new analytics services, called "expected service usage" and "abnormal service usage."

Expected service usage provides analysis about expected distribution of analytics requests received by an NF, while abnormal service usage provides analytics whether the current service usage (i.e., the current analytics requests received by the consumer of the service) is abnormal compared with the expected service usage (provided by the analysis generated by expected service usage service).

By comparing the distribution of the requests received, abnormal service usage service is able to detect an attempt of model/analytic function stealing, i.e., approximating the AI/ML model functionalities by looking at the input/output pairs. Since model and/or analytics function stealing requires making several queries specifically generated to extract maximal information from the producer, the introduced service is able to detect when incoming requests show an abnormal behavior.

Therefore, in illustrative embodiments, a service consumer (i.e., an NF and/or a MnS) can request/subscribe to these services to protect itself, e.g., from inference attacks at AI/ML models and/or analytics functions, or membership attacks aimed at inferring sensitive information (as members of the training dataset) about the input data utilized to generate such analytics.

Furthermore, illustrative embodiments enable distributed attack detection even in the case in which the frequency of the requests received by a NF is normal (i.e., the malicious consumers are not performing a distributed denial-of-service (DDoS) attack). By monitoring the distribution of the requests received from all the consumers requiring a specific service, the NWDAF is able to detect model functionalities reproduction attacks even if the frequency of the incoming requests is as expected.

Once an attack has been detected, the service consumer may inform OAM and/or temporally deny access to the required service to the potential attacker.

Thus, illustrative embodiments provide analytics services to protect a service producer against model/analytics/information inferring:

1. Expected service usage analytics service that takes as input the requests received by a service producer, and provides as output the analysis of the expected incoming requests distribution.

2. Abnormal service usage analytics service that takes as input the expected behavior of the service producers' incoming requests and provides monitoring the arriving service requests and analysis of the behavior of the service consumer.

3. A security mechanism to detect possible privacy attacks aimed at inferring model/analytics functionalities or at inferring sensitive information as the input data utilized by the service producer for training the AI/ML model and/or its architecture. Leveraging on the analytics produced by the abnormal service usage service, a service producer is able to take appropriate actions, e.g., block potential attackers (also distributed attacks are detected) and inform the OAM in order to take further action(s).

Some illustrative embodiments may be incorporated as new services and corresponding procedures in TS 23.288 (NWDAF) and TR 28.809 (MDAS).

Figure 3:
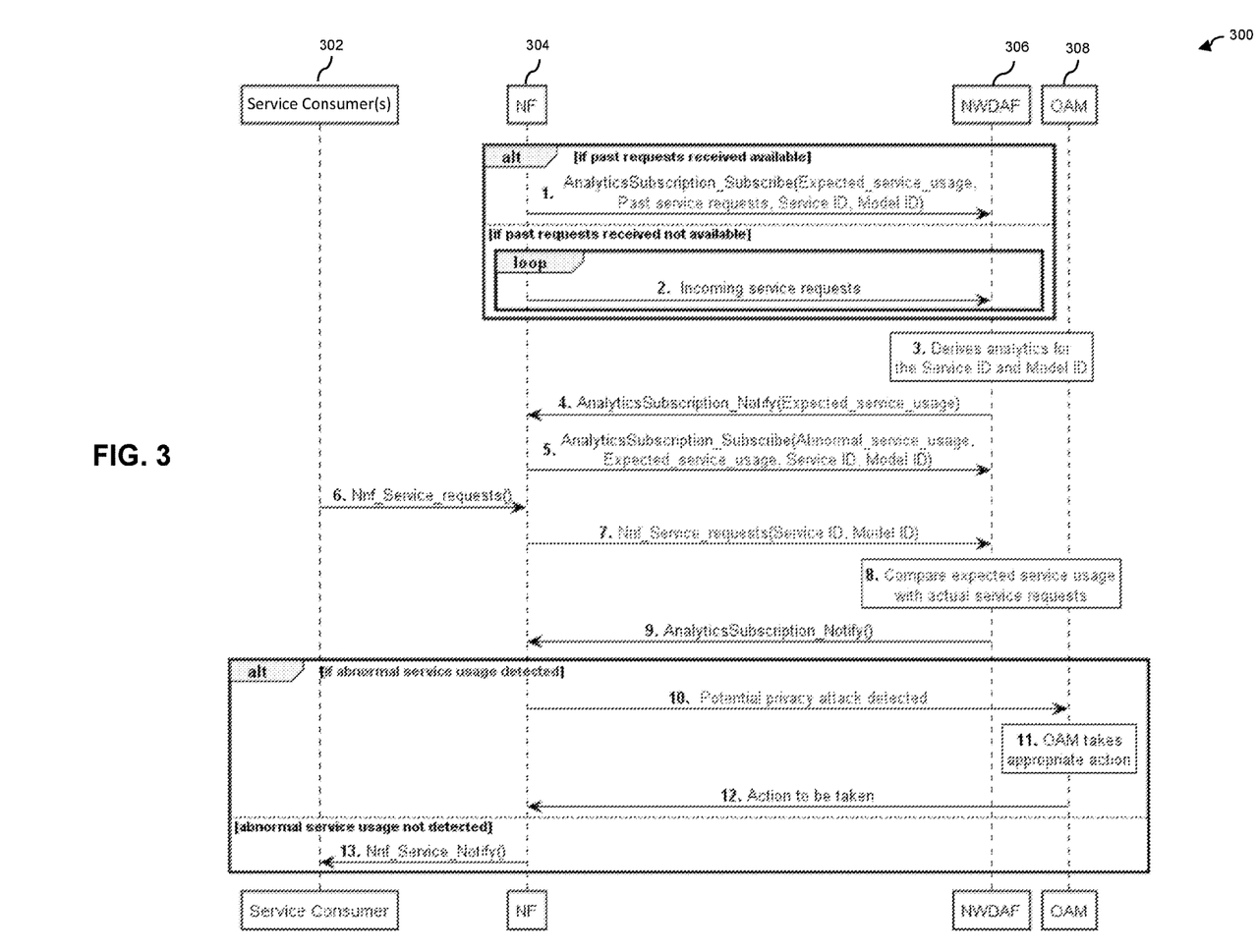
FIG. 3 illustrates a process for detecting abnormal network function service usage according to an illustrative embodiment.

FIG. 3 illustrates a process 300 for detecting abnormal network function service usage according to an illustrative embodiment. While process 300 is directed to an NWDAF implementation, process 300 may be adapted in a straightforward manner to an MDAS implementation. As shown, process 300 involves one or more service consumers 302, an NF 304, an NWDAF 306 and an OAM 308. Steps 1-13 as referenced in FIG. 3 will be described in detail below.

Step 1. An NF 304 subscribes to the expected service usage analytics service of NWDAF 306 specifying among other attributes the service subject of the analysis through the Service ID attribute, the Model ID of the AI/ML model employed to provide the service and providing if available the service requests received in the past. The history of the requests (including the Service ID attribute and the Model ID) received by a service of an NF may be stored at the ADRF (not expressly shown). In this way, NWDAF 306 may retrieve at any time the past requests received from all the NF instances deployed in the network. NF 304 may be an NWDAF(AnLF), i.e., an NWDAF containing an Analytics Function, or any 5GC NF that may employ an AI/ML model for providing the specific service.

Step 2. In case NF 304 does not have the history of the incoming requests received for the specific service, it forwards to NWDAF 306 the incoming requests for the specific service. The history of the requests received by a service of an NF may be stored at the ADRF. In this way, NWDAF 306 may retrieve at any time the past requests received from all the NF instances deployed in the network.

Step 3. NWDAF 306 derives the analytics about the distribution of the incoming requests received by the specific service. In the case the NF 304 is a NWDAF(AnLF), NWDAF 306 keeps track also of the prediction accuracy of the analytics service provided by the NWDAF(AnLF). The prediction accuracy distribution can be leveraged to detect potential membership attacks aimed at inferring information about the training data (the accuracy is usually higher for data utilized for training an AI/ML model).

Step 4. NWDAF 306 notifies NF 304 with the analysis produced. NWDAF 306 stores the analysis produced per NF—Service ID and Model ID at the ADRF.

Step 5. NF 304 subscribes to abnormal service usage analytics service of NWDAF 306 specifying among other attributes the service subject of the analysis through the Service ID attribute, the Model ID of the AI/ML model employed for providing the specific service, and providing the analysis about the expected service usage if available. NWDAF 306 may retrieve, if available, the analysis related to the expected service usage of a specific service and AI/ML model of an NF from the ADRF.

Step 6. One or more service consumers 302 send their requests to the service of NF 304. Distributed attackers may coordinate by sending multiple requests to reproduce the AI/ML model functionality.

Step 7. NF 304 forwards the received requests to NWDAF 306 for analysis specifying the Service ID and the Model ID.

Step 8. NWDAF 306 evaluates the distribution of the incoming requests received by the service of NF 304 and compares it with the expected service usage to detect potential privacy attacks at AI/ML model. Even in case of a distributed attack with requests having a normal frequency (i.e., DDoS is not detected), NWDAF 306 is able to detect potential attacks since model and/or analytics function reproduction requires making several queries specifically generated to extract maximal information. In case NF 304 is an NWDAF(AnLF), NWDAF 306 may retrieve from the ADRF also the prediction accuracy distribution. This allows NWDAF 306 to detect potential membership attacks aimed at inferring training input, because the accuracy distribution over training input is usually higher compared with usual input data.

Step 9. NWDAF 306 notifies NF 304.

Step 10. If abnormal service usage is detected, NF 304 informs OAM 308 about the potential privacy attack.

Step 11. OAM 308 takes appropriate action(s) to block the attack so as to limit the access to the service of NF 304.

Step 12. The action is forwarded to NF 304.

Step 13. In case no abnormal service usage is detected, NF 304 answers service consumer(s) 302 with the required output.

The particular processing operations and other system functionality described in conjunction with the diagrams described herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

Further, the term "obtaining" as illustratively used herein from the perspective of a given entity obtaining some item (e.g., result, data, distribution, etc.) can refer to the entity generating the item itself, the entity receiving the item from another entity, or some combination thereof.

It should again be emphasized that the various embodiments described herein are presented by way of illustrative example only and should not be construed as limiting the scope of the claims. For example, alternative embodiments can utilize different communication system configurations, user equipment configurations, base station configurations, provisioning and usage processes, messaging protocols and message formats than those described above in the context of the illustrative embodiments. These and numerous other alternative embodiments within the scope of the appended claims will be readily apparent to those skilled in the art.

What is claimed is:

1. An apparatus comprising:
   at least one processor;
   at least one memory including computer program code;
   the at least one memory and the computer program code being configured to, with the at least one processor, cause the apparatus at least to:
   obtain one or more service requests previously received by a network entity for a service which the network entity is configured to provide in a communication network, the service comprising an analytic model;
   obtain an analysis of the one or more service requests previously received by the network entity for the service;
   obtain an expected service usage for the service from the analysis of the one or more service requests; and
   identify, based at least in part on the expected service usage, whether a distribution of service requests received by the network entity for the service comprises an abnormal service usage;
   wherein the distribution of service requests is identified as abnormal service usage based at least in part on determining whether inputs of the service requests received by the network entity are associated with outputs of the analytics model that identify at least one of (i) a model architecture of the analytic model and (ii) training data utilized to train the analytic model.

2. The apparatus of claim 1, wherein the at least one memory and the computer program code are configured to, with the at least one processor, further cause the apparatus to:
   receive, from the network entity, one or more service requests received by the network entity for the service from one or more service consumers;
   compare the received one or more service requests to the expected service usage; and
   notify the network entity of a result of the comparison to enable at least one action to be taken upon detection of a given condition.

3. The apparatus of claim 2, wherein the at least one action comprises at least one remedial action based on the given condition detected.

4. The apparatus of claim 2, wherein the at least one memory and the computer program code are configured to, with the at least one processor, further cause the apparatus to obtain a prediction accuracy distribution for use in detection of the given condition.

5. The apparatus of claim 1, wherein the analytic model is uniquely identified by a model identifier.

6. The apparatus of claim 5, wherein the analytic model comprises at least one of an Artificial Intelligence (AI) model and a Machine Learning (ML) model.

7. The apparatus of claim 1, wherein obtaining the expected service usage for the service further comprises the apparatus at least one of generating the expected service usage and receiving the expected service usage from another network entity.

8. The apparatus of claim 1, wherein the apparatus comprises at least one of a Network Data Analytics Function (NWDAF) and a Management Data Analytics Service (MDAS).

9. A method comprising:
   obtaining, at a first network entity, one or more service requests previously received by a second network entity for a service which the second network entity is configured to provide in a communication network, the service comprising an analytic model;
   obtaining, at the first network entity, an analysis of the one or more service requests previously received by the second network entity for the service;
   obtaining, at the first network entity, an expected service usage for the service from the analyzed one or more service requests; and
   identify, at the first network entity based at least in part on the expected service usage, whether a distribution of service requests received by the network entity for the service comprises an abnormal service usage;
   wherein the distribution of service requests is identified as abnormal service usage based at least in part on determining whether inputs of the service requests received by the network entity are associated with outputs of the analytics model that identify at least one of (i) a model architecture of the analytic model and (ii) training data utilized to train the analytic model.

10. The method of claim 9, further comprising:
    receiving, at the first network entity from the second network entity, one or more service requests received by the second network entity for the service from one or more service consumers;
    comparing, at the first network entity, the received one or more service requests to the expected service usage; and notifying, by the first network entity, the second network entity of a result of the comparison to enable at least one action to be taken upon detection of a given condition.

11. The method of claim 10, wherein the at least one action comprises at least one remedial action based on the given condition detected.

12. The method of claim 10, further comprising the first network entity obtaining a prediction accuracy distribution for use in detection of the given condition.

13. The method of claim 9, wherein the analytic model is uniquely identified by a model identifier.

14. The method of claim 13, wherein the analytic model comprises an Artificial Intelligence (AI) model and/or Machine Learning (ML) model.

15. The method of claim 9, wherein obtaining the expected service usage for the service further comprises the first network entity at least one of generating the expected service usage and receiving the expected service usage from another network entity.

16. An article of manufacture comprising a non-transitory computer-readable storage medium having embodied therein executable program code that when executed by a processor causes the processor to perform the steps of claim 9.

17. An apparatus comprising:
at least one processor;
at least one memory including computer program code;
the at least one memory and the computer program code being configured to, with the at least one processor, cause the apparatus at least to:
send, to a network entity, one or more service requests received by the apparatus from one or more service consumers for a service which the apparatus is configured to provide in a communication network, the service comprising an analytic model; and
receive, from the network entity, a notification of a result of a comparison of the one or more service requests to an expected service usage, wherein the notification indicates detection of a given condition;
wherein the given condition comprises a determination that a distribution of service requests received by the apparatus for the service comprises an abnormal service usage; and
wherein the distribution of service requests is determined to be the abnormal service usage based at least in part on determining whether inputs of the service requests received by the apparatus are associated with outputs of the analytic model that identify at least one of (i) a model architecture of the analytic model and (ii) training data utilized to train the analytic model.

18. The apparatus of claim 17, wherein the at least one memory and the computer program code are configured to, with the at least one processor, further cause the apparatus to send a notification to another network entity to enable at least one action to be taken for the given condition.

19. The apparatus of claim 17, wherein the apparatus comprises at least one of a Network Function (NF) and a Network Data Analytics Function containing Analytics Logical Functionality (NWDAF (AnLF).

20. The apparatus of claim 17, wherein the other network entity from which the apparatus receives the notification indicating detection of the given condition comprises an Operation, Administration and Maintenance (OAM) entity.

* * * * *